United States Patent
Chen et al.

(10) Patent No.: US 8,269,624 B2
(45) Date of Patent: Sep. 18, 2012

(54) POSITIONING APPARATUS AND METHOD

(75) Inventors: Yung-Yu Chen, Pingtung County (TW);
Shyang-Jye Chang, Taipei County (TW); Sheng-Chih Shen, Tainan County (TW); Ren-Yuan Yu, Hsinchu (TW); Shih-Hao Wang, Taichung (TW)

(73) Assignee: Industrial Technology Research Institute, Hsing-chu (TW)

( * ) Notice: Subject to any disclaimer, the term of this patent is extended or adjusted under 35 U.S.C. 154(b) by 324 days.

(21) Appl. No.: 11/979,904

(22) Filed: Nov. 9, 2007

(65) Prior Publication Data
US 2008/0158052 A1 Jul. 3, 2008

(30) Foreign Application Priority Data
Dec. 27, 2006 (TW) ................................ 95149115 A

(51) Int. Cl.
*G08B 1/08* (2006.01)

(52) U.S. Cl. .................... 340/539.13; 701/207; 701/215; 701/220; 340/988; 340/989; 340/990; 340/993

(58) Field of Classification Search ............. 340/539.13; 701/215, 220; 702/94
See application file for complete search history.

(56) References Cited

U.S. PATENT DOCUMENTS

| | | | | |
|---|---|---|---|---|
| 6,944,542 B1 * | 9/2005 | Eschenbach | ................... | 701/220 |
| 2003/0135327 A1 * | 7/2003 | Levine et al. | ................... | 701/220 |
| 2007/0250261 A1 * | 10/2007 | Soehren | ........................ | 701/207 |

FOREIGN PATENT DOCUMENTS

| | | |
|---|---|---|
| TW | 252441 | 4/2006 |
| TW | 290247 | 5/2006 |

* cited by examiner

*Primary Examiner* — George Bugg
*Assistant Examiner* — Ojiako Nwugo
(74) *Attorney, Agent, or Firm* — Stites & Harbison, PLLC; Juan Carlos A. Marquez, Esq

(57) ABSTRACT

A positioning apparatus is disclosed, which comprises: a position detection module, including an inertial sensor, a magnetometer, and a global positioning device, being used for detection a movement of an object and thus generating a positioning signal accordingly; wherein the positioning signal is transmitted to a control unit and then to a signal processing device where it is being processed and converted into an angular/displacement signal to be transmitted to a monitoring device by way of a signal transmission device for enabling the monitoring device to track the movement of the object. In a preferred embodiment, both of the monitoring device and the signal transmission device are respectively being configured with a displaying unit for displaying the movement of the object. In addition, the positioning apparatus further comprises an identity module, for providing a unique identification code to the object to be used for identifying the same. With the aforesaid apparatus, the object can be positioned and monitored in a remote manner no matter it is being shielded or not.

12 Claims, 2 Drawing Sheets

POSITIONING APPARATUS AND METHOD

FIELD OF THE INVENTION

The present invention relates to a positioning apparatus and method, and more particularly, to an apparatus for positioning objects configured with inertial sensor, magnetometer, position detection module embedded with global position system and wireless transmission module that is capable of achieving accurately positioning an object without being affected by shields and also can be used for remotely tracking and monitoring the positioned object.

BACKGROUND OF THE INVENTION

Global Position System (GPS) has become a widely used aid to navigation worldwide, and a useful tool for map-making, land surveying, commerce, and scientific uses, providing that it enables a GPS receiver to rapidly and effectively determine its location, speed and direction at high accuracy. However, as GPS signals can be easily affected by environmental factors, such as terrain and weather, the signal delay effect resulting from such environment factors may severely affect the GPS position accuracy, which is especially critical for locations where the GPS signals are reflected off or even blocked by surrounding terrain, buildings, canyon walls, or indoors, etc. For achieving accurately positioning an object without being affected by shields, other positioning apparatuses for assisting the GPS are required.

One such positioning apparatus is disclosed in U.S. Pat. No. 6,944,542, entitled "Position Determination System for Movable Objects or Personnel", which is a position determination system integrated with a GPS receiver, an INS (inertial navigation system) device and a wireless transmission module an inertial navigation system (INS). While the aforesaid positioning determination system is used for tracking a movable object, an initial position of the movable object is first being located by the GPS receiver to be used as the datum point of the INS device, with reference to which, when the movable object is moved to a location where the GPS signal is blocked and thus the GPS receiver is no longer able to locate the position of the movable object, the velocity/acceleration data indicative of velocity/acceleration of the movable object detected by the INS device can be converted into meaningful position signals that is to be transmitted to a monitor station for tracking the movement of the object. For instance, miners inside mines could benefit from such a position determination system, in that the position of a miner could first be uniquely determined and located by the GPS receiver, and then as soon as the miner enters the mine where the GPS signal is blocked, the position determination system will switch to locate the position of the miner by the INS device while transmitting the detected position to a ground monitoring station by the wireless transmission module. However, the aforesaid position determination system is only a local positioning system that it is incapable of positioning, tracking and monitoring a movable object in a remote manner.

SUMMARY OF THE INVENTION

The object of the present invention is to provide a positioning apparatus capable of achieving accurately positioning an object without being affected by shields and also can be used for remotely tracking and monitoring the positioned object.

To achieve the above object, the present invention provides a positioning apparatus comprising: a position detection module, being used for detection a movement of an object and thus generating a positioning signal accordingly; a control unit, for receiving the positioning signal from the position detection module; a signal processing device, capable of processing the positioning signal received from the control unit and thus generating an angular/displacement signal accordingly; a signal transmission device, for transmitting the angular/displacement signal; a monitoring device, capable of receiving the angular/displacement signal while using the same for tracking the movement of the object.

In an exemplary embodiment of the invention, the position detection module comprises: an inertial sensor, for measuring variation of the object's movement; a magnetometer, for providing an azimuth angle with respect to an absolute coordinate system for the object; and a global positioning device, for locating the position of the object with respect to the absolute coordinate system.

In an exemplary embodiment of the invention, the inertial sensor further comprises: an accelerator, for detecting accelerations from the movement of the object; and a gyroscope, for detecting an angular velocity variation from the movement of the object.

In an exemplary embodiment of the invention, the accelerometer is capable of detecting and measuring three accelerations measured along three orthogonal axes of a coordinate system.

In an exemplary embodiment of the invention, the signal transmitting device further comprises: a wireless transmission module, for transmitting the angular/displacement signal of the signal processing device to a receiving unit in a wireless manner; the receiving unit, for receiving the angular/displacement signal transmitted from the wireless transmission module and then passing the received angular/displacement signal to the monitoring device.

In an exemplary embodiment of the invention, the wireless transmission protocol used by the wireless transmission module is a protocol selected from the group consisting of Bluetooth, Ultra-Wideband (UWB), and Wireless Fidelity (Wi-Fi).

In an exemplary embodiment of the invention, the receiving device is connected to the monitoring device by a means selected from the group consisting a wired mean and a wireless means.

In an exemplary embodiment of the invention, the receiving device is connected to the monitoring device by a network system configured with telephone lines, optic fibers and power lines.

In an exemplary embodiment of the invention, the receiving device is connected to the monitoring device by a wireless communication system with access point (AP) ability.

In an exemplary embodiment of the invention, the receiving device further comprises a displaying unit, used for displaying the movement of the object.

In an exemplary embodiment of the invention, the displaying unit of the receiving device is a device selected from the group consisting of a computer monitor, a television set, and a projector.

In an exemplary embodiment of the invention, the control unit and the signal processing device is integrated and modularized as a single device.

In an exemplary embodiment of the invention, the control unit and the signal processing device is integrated and modularized as a chip.

In an exemplary embodiment of the invention, the monitoring device further comprises a displaying device, used for displaying the movement of the object.

In an exemplary embodiment of the invention, the displaying unit of the monitoring device is a device selected from the group consisting of a computer monitor, a television set, and a projector.

In an exemplary embodiment of the invention, the positioning apparatus further comprises an identity module, for providing a unique identification code to the object to be used for identifying the same.

To achieve the above object, the present invention provides a positioning method, comprising the steps of:
(a) using a position detection module to detect a movement of an object and thus generate a corresponding positioning signal;
(b) transmitting the positioning signal to a control unit and a signal processing device;
(c) enabling the signal processing device to processed the received positioning signal for generating an angular/displacement signal accordingly;
(d) transmitting the angular/displacement signal to a monitoring device by way of a signal transmission device for enabling the monitoring device to track the movement of the object.

Moreover, to achieve the above object, the present invention provides a positioning comprising: a position detection module, being used for detection a movement of an object and thus generating a positioning signal accordingly; a control unit, for receiving the positioning signal from the position detection module; a signal processing device, capable of processing the positioning signal received from the control unit and thus generating an angular/displacement signal accordingly; and a wireless transmission module, for transmitting the angular/displacement signal to a receiving device in a wireless manner.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
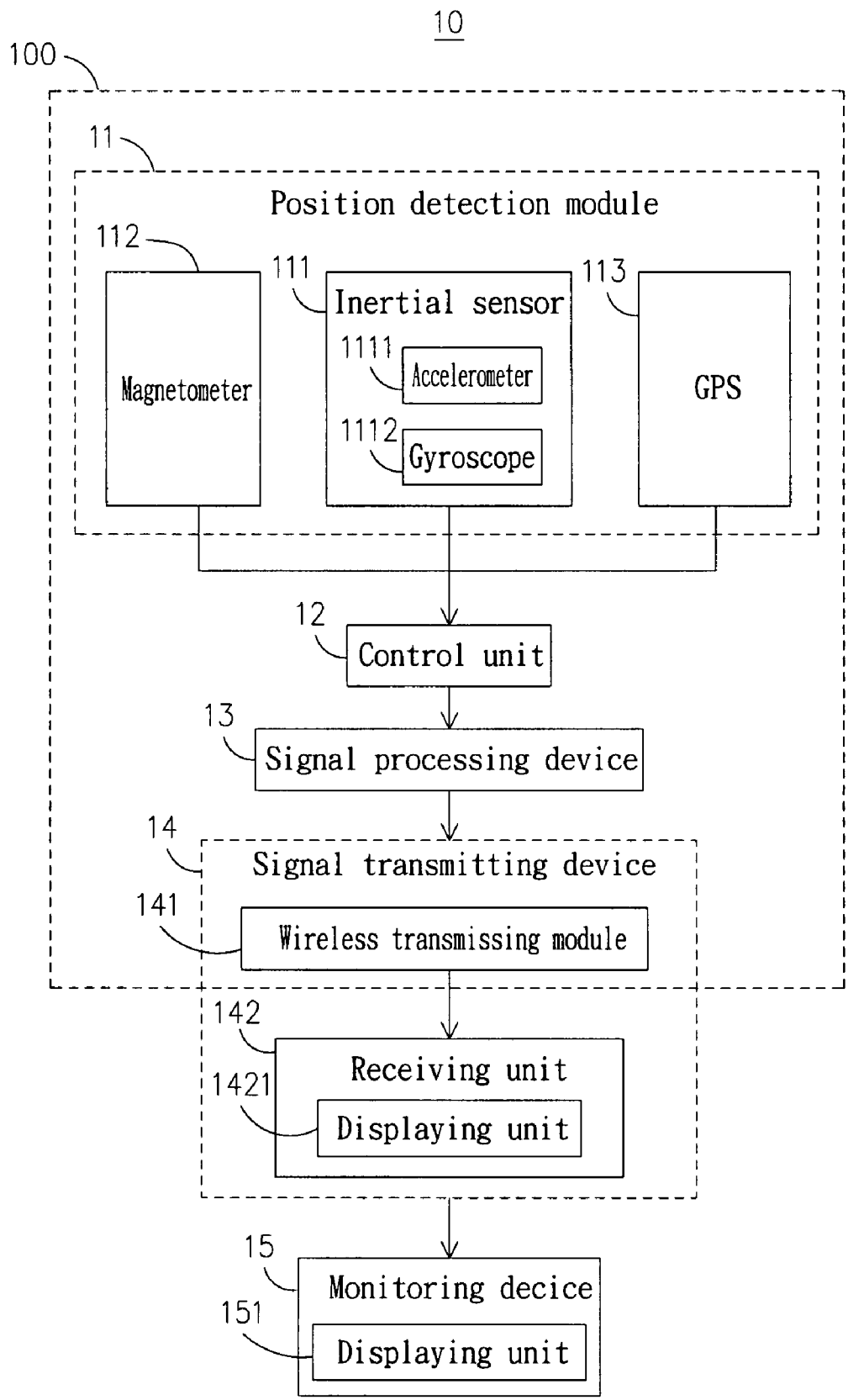
FIG. 1 is a block diagram showing a positioning apparatus for objects according to an exemplary embodiment of the invention.

Please refer to FIG. 1, which is a block diagram showing a positioning apparatus for objects according to an exemplary embodiment of the invention. The positioning apparatus 10 of FIG. 1 is comprised of: a position detection module 11, including an inertial sensor 111, a magnetometer 112, and a global positioning device 113, and used for used for detection a movement of an object and thus generating a positioning signal accordingly; a control unit 12, for receiving the positioning signal from the position detection module 11; a signal processing device 13, capable of processing the positioning signal received from the control unit 12 and thus generating an angular/displacement signal accordingly; a signal transmission device 14, for transmitting the angular/displacement signal; and a monitoring device 15, capable of receiving the angular/displacement signal while using the same for tracking the movement of the object. In FIG. 1, the inertial sensor 111 is further being comprised of: an accelerometer 1111, for detecting and measuring at least three accelerations measured along three orthogonal axes of a coordinate system; and a gyroscope 1112, detecting an angular velocity variation from the movement of the object. Moreover, the magnetometer 112 is capable of sensing and measuring the strength and/or direction of the Earth's magnetic field while using the detected Earth's magnetic field for determining the moving direction of the object and thus providing an azimuth angle with respect to an absolute coordinate system for the object; and the global positioning device 113 is able to communicate with a positioning satellite and thus determining the coordinate for the object with respect to the absolute coordinate system. Therefore, by the cooperation of the inertial sensor 111, the magnetometer 112 and the global positioning device 113, the displacements, rotation as well as its moving direction can be detected and measured; that is, When the object is located at a position where it is not being shielded, the global positioning device 113 is the one used for generating the positioning signal for locating the object; but when the object is located at a position where it is being shielded, the inertial sensor 111 and the magnetometer 112 will be activated to generate the positioning signal for locating the object. It is noted that the switching between the global positioning device 113, the inertial sensor 111 and the magnetometer 112 can be automated by circuit control or programs with reference to the corresponding signal strength, however, it is known to those skilled in the art and thus is not described further herein. In addition, the control unit 12 and the signal processing device 13 can be integrated and modularized as a single device or a chip.

In FIG. 1, the signal transmission device 14 is further comprised of a wireless transmission module 141 and a receiving unit 142; wherein the wireless transmission module 141 is used for transmitting the angular/displacement signal of the signal processing device to a receiving unit in a wireless manner; and the receiving unit 142 is used for receiving the angular/displacement signal transmitted from the wireless transmission module 141 and then passing the received angular/displacement signal to the monitoring device 15 located at an remote end.

The aforesaid positioning detection module 11, control unit 12, signal processing device 13 and the wireless transmission module 141 of the signal transmitting device 14 can be integrated and configured as a compact portable positioning apparatus 100 while configuring the receiving unit 142 and the monitoring device 15 as a separate device so that compact portable positioning apparatus 100 can be hand-carried, or be installed on moving objects, such as vehicles or containers, or can be further integrated with other portable devices, such as PDAs or cellular phones. Moreover, the wireless transmission protocol used by the wireless transmission module 141 can be a protocol selected from the group consisting of Bluetooth, Ultra-Wideband (UWB), and Wireless Fidelity (Wi-Fi). Thereby, when the compact portable positioning apparatus is carried by a user, the wireless communication between the wireless transmission module 141 and the receiving unit 142 will enable the position of the user being tracked at all time.

It is noted that the receiving unit 142 can be connected to the monitoring 15 by a wired means or a wireless means. For instance, the receiving unit 142 is connected to the monitoring device 15 by a network system configured with telephone lines, optic fibers and power lines; or the receiving unit 142 is connected to the monitoring device 15 by a wireless communication system with access point (AP) ability. Moreover, a displaying device 1421 can be configured in the receiving unit 142 so as to be used for displaying the movement of the object, which can be a device selected from the group consisting of a computer monitor, a television set, and a projector. In addition, there can also be a displaying device 151 being configured in the monitoring device 15 so as to be used for displaying the movement of the object, which can be a device selected from the group consisting of a computer monitor, a television set, and a projector. Thereby, as soon as the monitoring device 15 received the angular/displacement signal transmitted from the receiving unit 141, the position and the moving trace of the object can be displayed on the displaying device 151.

Figure 2:
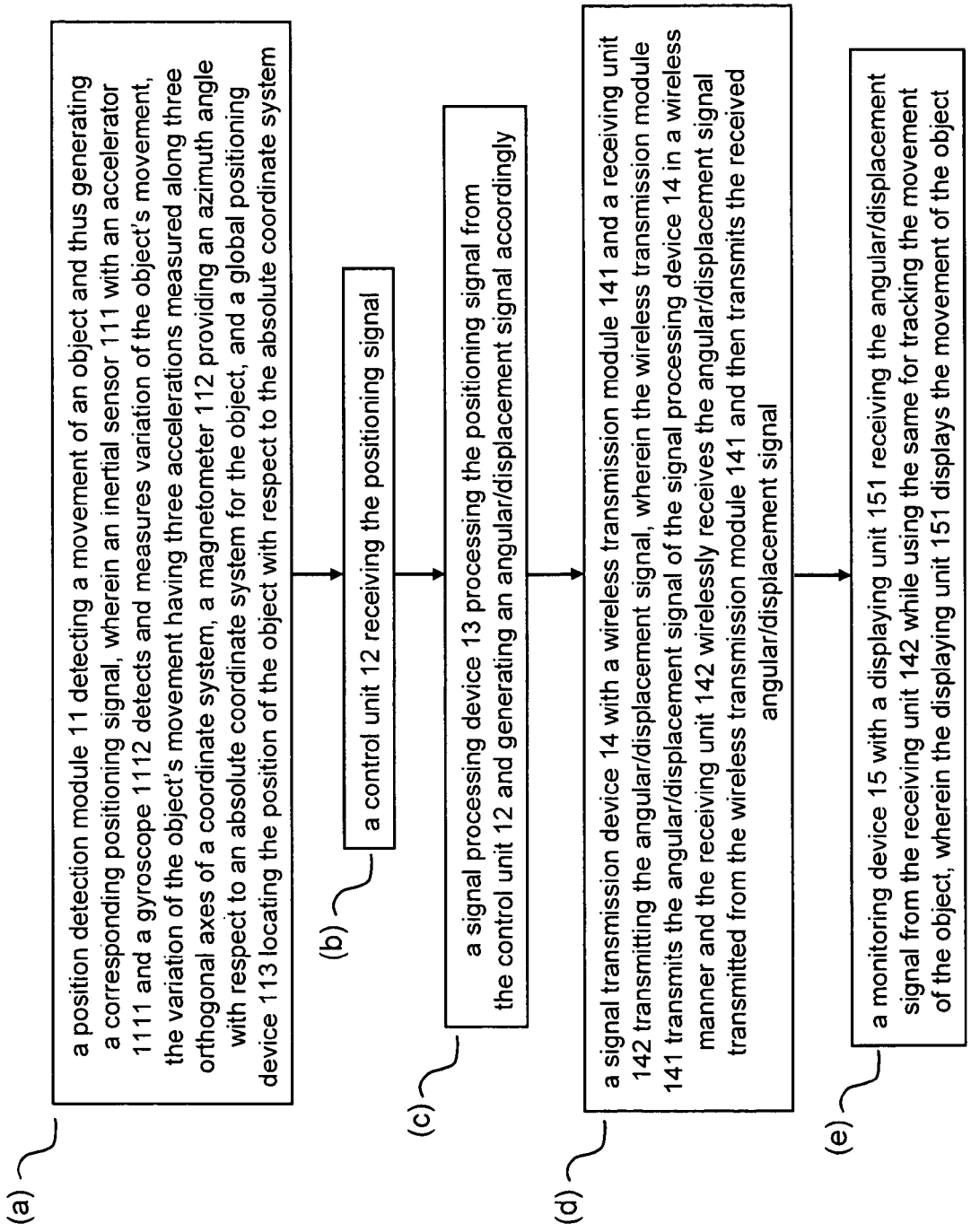
FIG. 2 is a flow chart depicting steps of a method for positioning objects according to an exemplary embodiment of the invention.

With respect to the aforesaid positioning apparatus 10, a positioning method for objects can be concluded and provided. Please refer to FIG. 2, which is a flow chart depicting steps of a method for positioning objects according to an exemplary embodiment of the invention. The positioning method of FIG. 2 comprises the steps of:

(a) a position detection module 11 detecting a movement of an object and thus generate a corresponding positioning signal, wherein an inertial sensor 111 with an accelerator 1111 and a gyroscope 1112 detects and measures variation of the object's movement, the variation of the object's movement having three accelerations measured along three orthogonal axes of a coordinate system, a magnetometer 112 providing an azimuth angle with respect to an absolute coordinate system for the object, and a global positioning device 113 locating the position of the object with respect to the absolute coordinate system;

(b) a control unit 12 receiving the positioning signal;

(c) a signal processing device 13 processing the positioning signal from the control unit 12 and generating an angular/displacement signal accordingly;

(d) a signal transmission device 14 with a wireless transmission module 141 and a receiving unit 142 transmitting the angular/displacement signal, wherein the wireless transmission module 141 transmits the angular/displacement signal of the signal processing device 14 in a wireless manner and the receiving unit 142 wirelessly receives the angular/displacement signal transmitted from the wireless transmission module 141 and then transmits the received angular/displacement signal; and (e) a monitoring device 15 with a displaying unit 151 receiving the angular/displacement signal from the receiving unit 142 while using the same for tracking the movement of the object, wherein the displaying unit 151 displays the movement of the object.

As the positioning apparatus is designed to be compact and portable as well as being equipped simultaneously with monitoring and tracking abilities, it can be attached to a patient easily and without any inconvenience, and thereby, an operator at an remote location operating the monitoring device 15 can be notified as soon as the patient is in trouble so that he/she can inform any medical facility located nearest to the patient for providing assistant. Moreover, in order to rapidly and clearly identify the identity of the patient, the positioning apparatus 100 is further being embedded with an identity module, which is used for providing a unique identification code to the object or patient to be used for identifying the same since the identification code can be used as the index for searching the database of the monitoring device 15 for revealing the information relating to that identification code of the displaying device 151 of the monitoring device 15. With the aforesaid apparatus, the object can be positioned and monitored in a remote manner no matter it is being shielded or not. That is, the positioning accuracy of the positioning apparatus of the invention will not be affected no matter the user is situated in an indoor environment, in a basement, in an alley between tall buildings, or in a canyon surrounded by mountains, which is especially suitable to be used as the safety device for children, elders, people who are required to work late, and disabled people. Instead of being worn on human body, the positioning apparatus of the invention can be attached to objects, such as vehicles, containers, or even consumer goods, or it can be integrated with portable items, such PDAs or cellular phones, so that it is not only practical, but also commercially competitive.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A positioning method, comprising the steps of:

(a) a position detection module detecting a movement of an object and thus generating a corresponding positioning signal, wherein the step of detecting the movement of an object includes the steps of (1) an inertial sensor with an accelerator and a gyroscope detecting and measuring three accelerations of an object's movement along three corresponding orthogonal axes of a coordinate system so as to measure variations in the object's movement, (2) a magnetometer providing an azimuth angle with respect to an absolute coordinate system for the object, and (3) a global positioning device locating the position of the object with respect to the absolute coordinate system, wherein the position detection module switches locating the position of the object between using the global positioning device and using the inertial sensor and the magnetometer in response to the global positioning device receiving a satellite signal such that the position detection module uses only the inertial sensor and the magnetometer when the global positioning device does not receive a satellite signal;

(b) a control unit receiving the positioning signal;

(c) a signal processing device processing the positioning signal from the control unit and generating an angular/displacement signal accordingly;

(d) a signal transmission device with a wireless transmission module and a receiving unit transmitting the angular/displacement signal, wherein the step of transmitting the angular/displacement signal includes the steps of the wireless transmission module transmitting the angular/displacement signal of the signal processing device in a wireless manner and the receiving unit wirelessly receiving the angular/displacement signal transmitted from the wireless transmission module and then transmitting the received angular/displacement signal, wherein the control unit, the signal processing device and the wireless transmission module are integrated with the position detection module; and (e) a monitoring device with a displaying unit receiving the angular/displacement signal from the receiving unit while using the same for tracking the movement of the object, and the displaying unit displaying the movement of the object via the signal transmission device enabling the monitoring device, the monitoring device being integrated with the receiving unit and remotely located from the position detection module so as to be independent from a location and movement of the position detection module.

2. The positioning method of claim 1, wherein the control unit and the signal processing device is integrated and modularized as a single device.

3. The positioning method of claim 2, wherein the single device is a chip.

4. The positioning method of claim 1, wherein the position detection module further includes an identity module, the method further comprising the step of:
the identity module providing a unique identification code to the object to be used for identifying the same.

5. The positioning method of claim 1, wherein the receiving unit is connected to the monitoring device by a wireless communication system with access point (AP) ability.

6. The positioning method of claim 1, wherein the receiving unit further comprises a displaying unit for displaying the movement of the object.

7. A positioning apparatus comprising:
a position detection module configured to detect a movement of an object and thus generate a positioning signal accordingly, the position detection module including
a magnetometer configured to determine an azimuth angle with respect to an absolute coordinate system for the object,
a global positioning device configured to locate the position of the object with respect to the absolute coordinate system,
an inertial sensor configured to detect and measure three accelerations along three orthogonal axes of a coordinate system so as to determine variations in the object's movement, wherein the inertial sensor comprises an accelerator configured to detect the accelerations from the movement of the object and a gyroscope configured to detect an angular velocity variation from the movement of the object,
a control unit configured to receive the positioning signal from the position detection module,
a signal processing device configured to process the positioning signal from the control unit and to generate an angular/displacement signal in response thereto, and
a signal transmission device for transmitting the angular/displacement signal, wherein the signal transmission device comprises a wireless transmission module configured to transmit the angular/displacement signal of the signal processing device in a wireless manner, and a receiving unit configured to wirelessly receive the angular/displacement signal transmitted from the wireless transmission module and then transmit the received angular/displacement signal, wherein
the position detection module is configured to switch locating the position of the object between using the global positioning device and using the inertial sensor and the magnetometer in response to the global positioning device receiving a satellite signal such that the position detection module uses only the inertial sensor and the magnetometer when the global positioning device does not receive a satellite signal, and
the control unit, the signal processing device and the wireless transmission module are integrated with the position detection module; and
a monitoring device configured to receive the angular/displacement signal from the receiving unit while using the same for tracking the movement of the object, wherein the monitoring device comprises a displaying unit for displaying the movement of the object, the monitoring device being integrated with the receiving unit and remotely located from position detection module so as to be independent from a location and movement of the position detection module.

8. The positioning apparatus of claim 7, wherein the control unit and the signal processing device is integrated and modularized as a single device.

9. The positioning apparatus of claim 8, wherein the single device is a chip.

10. The positioning apparatus of claim 7, wherein the receiving unit is connected to the monitoring device by a wireless communication system with access point (AP) ability.

11. The positioning apparatus of claim 7, wherein the receiving unit further comprises a displaying unit for displaying the movement of the object.

12. The positioning apparatus of claim 7, wherein the position detection module further comprises:
an identity module, for providing a unique identification code to the object to be used for identifying the same.

* * * * *